United States Patent [19]

Davision

[11] Patent Number: 5,123,462
[45] Date of Patent: Jun. 23, 1992

[54] VEHICLE-MOUNTED BRUSH CUTTER

[76] Inventor: Timothy A. Davision, 12100 203rd Ave. SE., Monroe, Wash. 98272

[21] Appl. No.: 696,002

[22] Filed: May 6, 1991

[51] Int. Cl.⁵ .............................................. A01G 23/08
[52] U.S. Cl. ............................... 144/34 R; 30/379 S; 83/928; 144/3 D; 144/336
[58] Field of Search ................ 83/928; 30/379, 379 S; 144/2 Z, 3 D, 34 R, 34 F, 33 S, 336

[56] References Cited

U.S. PATENT DOCUMENTS

| | | | |
|---|---|---|---|
| 2,668,566 | 2/1954 | Goodlet | 83/928 |
| 2,694,421 | 11/1954 | Shrewsbury | 83/928 |
| 3,343,575 | 9/1967 | Trout | 83/928 |
| 4,813,142 | 3/1989 | Manno | 30/379.5 |

*Primary Examiner*—W. Donald Bray
*Attorney, Agent, or Firm*—Harry M. Cross, Jr.

[57] ABSTRACT

An articulated brush cutting vehicle is provided having a rear powered unit and a front steering unit. A circular blade brush cutter is mounted on the forward end of a truss boom, the truss boom being pivotally mounted to the steering unit for side-to-side swinging movement and for up-and-down movement. Concealed hydraulic cylinders within said steering unit control the side-to-side movement of the boom and articulation between the vehicle units with minimal exposure of the cylinder rods during operation of the vehicle. The boom has an inverted apex on its bottom side so that the cutter may be operated even though there may be an obstruction between the steering unit and the cutter blade.

5 Claims, 5 Drawing Sheets

VEHICLE-MOUNTED BRUSH CUTTER

FIELD OF THE INVENTION

This invention relates to heavy duty brush cutting machinery and particularly to vehicle-mounted brush cutters.

BACKGROUND OF THE INVENTION

Heavy duty, commercial brush cutters have been used in connection with forestry management, right-of-way clearing and maintenance, and for similar purposes. These brush cutters typically employ heavy steel rotary circular blades that are mounted on tracked or rubber-tired vehicles by means of a boom or boom combination. The brush cutter blade is typically powered hydraulically and controlled from an operator's cab on the vehicle. An exemplary prior art blade may be six feet in diameter, weigh several hundred pounds, and contain upper and lower cutting teeth. Such a blade can thus cut brush from its upper and lower surfaces as well as its perhiphery. The momentum built up by a cutter blade of this size and the forces imposed on its supporting structure are substantial. Therefore, a substantial mounting assembly is required to handle the weight and kinetic energy forces present in the operation of such a brush cutter at the end of a boom. The resulting structure often has inhibited mobility and therefore limited application.

For example, in power line right-of-way maintenance, the brush cutter must be capable of traversing rugged terrain and negotiate around stumps and rocks without damage to the cutter assembly or its mounting assembly. For such uses, a highly mobile vehicle is required. Moreover, since the cutter blade can pick up a log or limb and slam it into the vehicle, the vehicle must be reinforced sufficiently to avoid the resulting impact force causing significant damage up to and including a breakdown.

SUMMARY OF THE INVENTION

A primary object of the present invention is to provide a highly mobile brush cutting vehicle adapted to mount a rotary steel disk-type cutter head on the end of an elongated boom assembly. The vehicle of this invention is preferably rubber tired, and comprises an articulated vehicle undercarriage. The preferred brush cutter includes a boom assembly provided with an upwardly-angulated mid-section that enables the lowering of the cutter assembly into cutting position even though a stump or other obstruction exists between the vehicle and the cutter assembly.

This an other objects and advantages of the brush cutter of this invention will become apparent from the following detailed description of the invention.

DETAILED DESCRIPTION OF THE INVENTION

Figure 1:
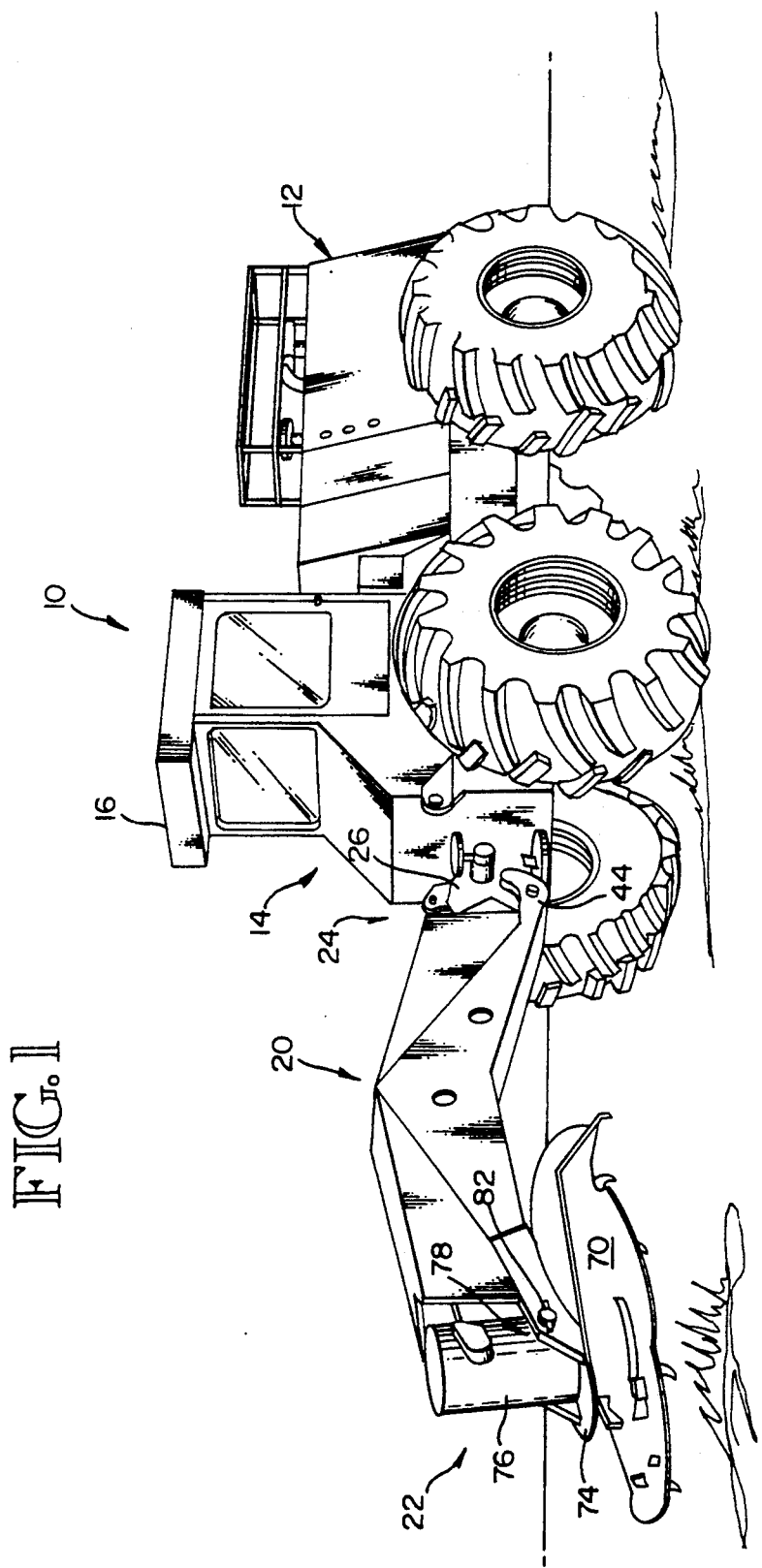
FIG. 1 is a perspective view of the brush cutter machine of this invention.
Figure 2:
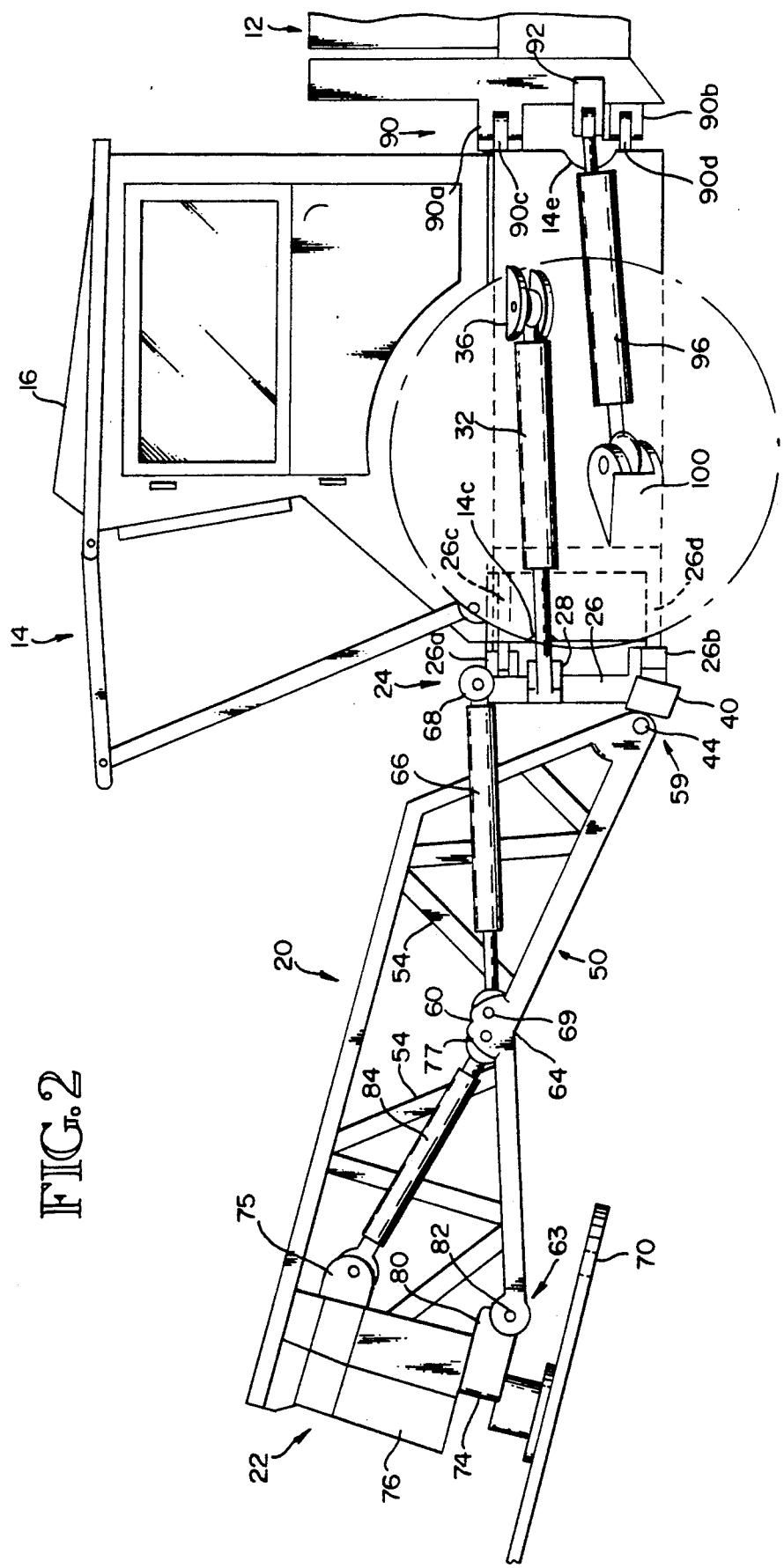
FIG. 2 is a side elevation of the boom and cab assemblies of the brush cutter machine of this invention, with the cab side plates.
Figure 3:
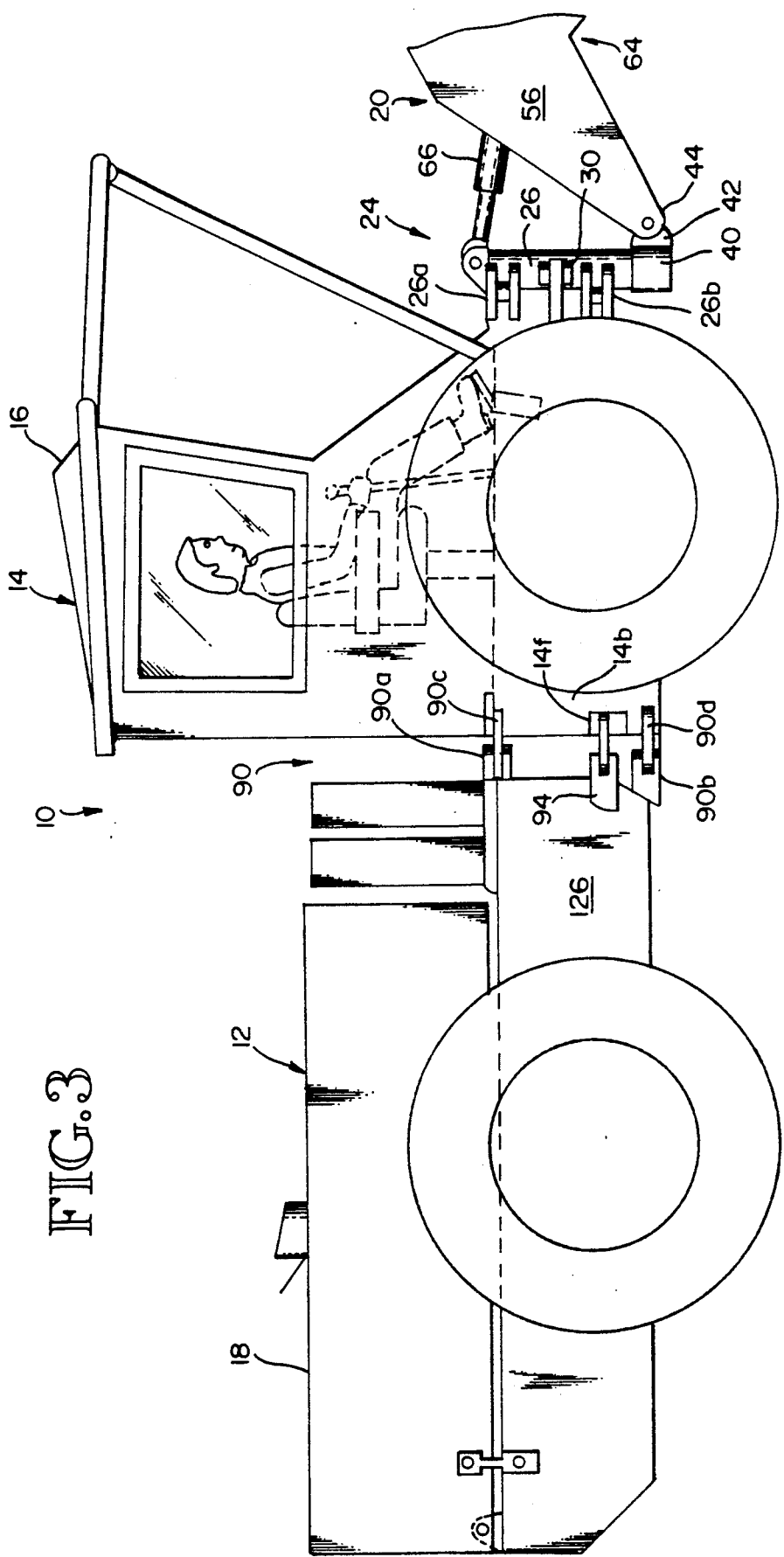
FIG. 3 is an opposite side elevation of the cab and engine assemblies of the brush cutter machine of this invention.
Figure 4:
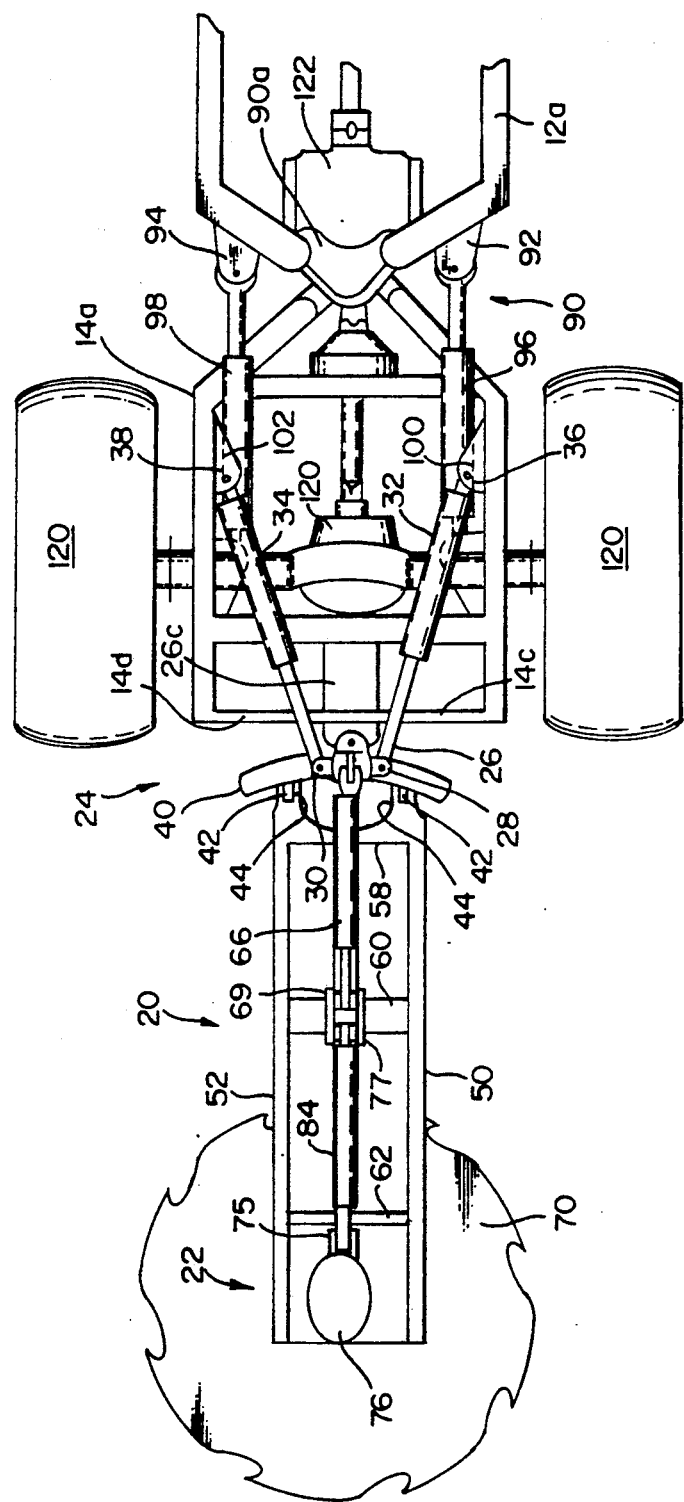
FIG. 4 is a top plan view of brush cutter machine of this invention with the superstructure removed.
Figure 5:
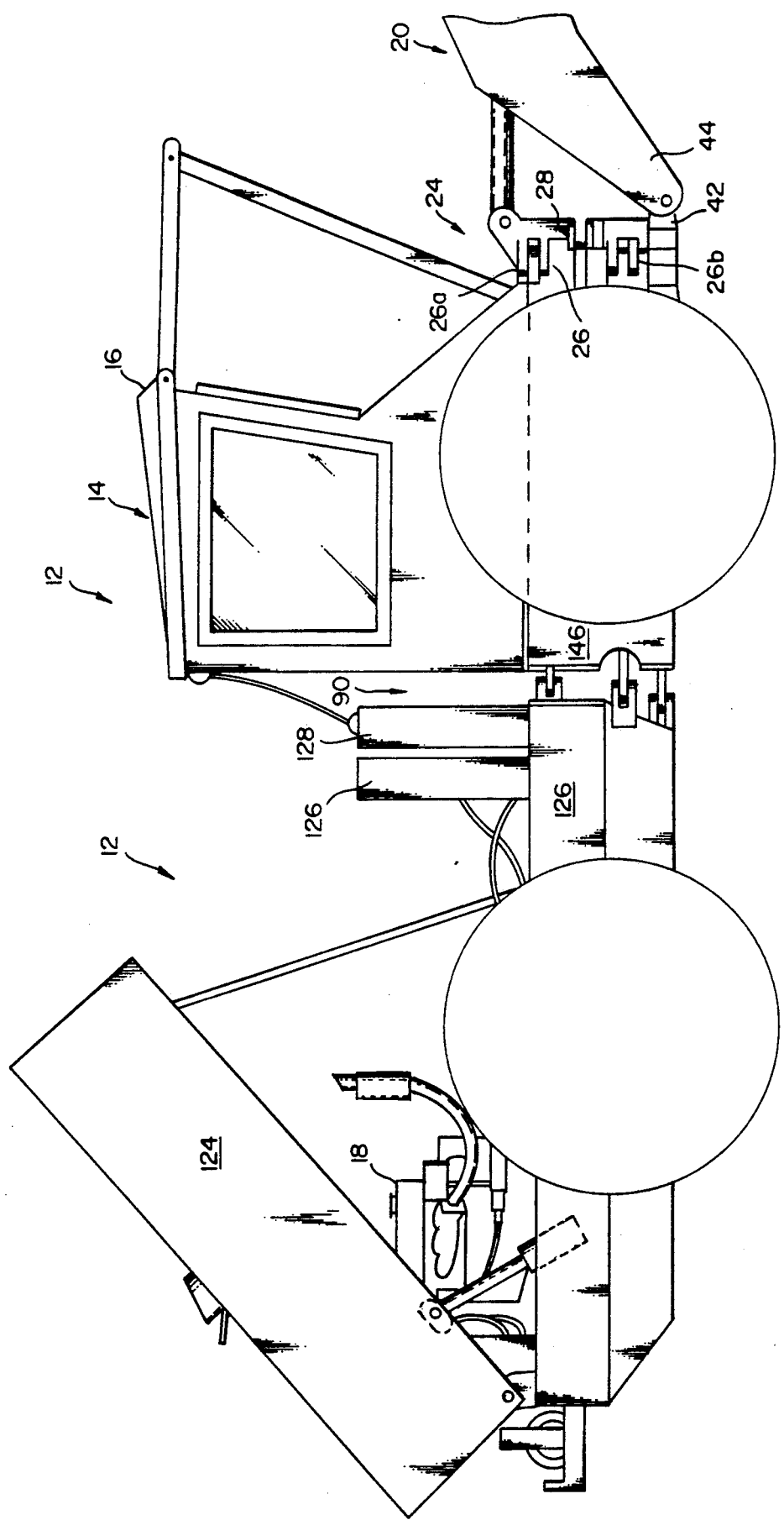
FIG. 5 is an opposite side elevation of the cab and engine assemblies with the engine housing raised to reveal the engine.

As shown, the preferred brush cutter system of this invention comprises a rubber tired vehicle 10 having an articulated undercarriage made up of a rear powered unit 12 and a front steering unit 14. The front unit mounts a cab assembly 16 and the rear unit mounts an engine assembly 18. The undercarriage units are fabricated with a steel bar framework 12a and 14a covered by steel plate 12b and 14b. A cutter boom 20 is pivotally attached to the front undercarriage framework for movement up and down and for movement from side to side. The boom mounts a cutter head assembly 22 at its outer end.

A boom mounting means 24 comprises a steel boom mount bracket 26, upper and lower steel clevis couplings 26a and 26b welded to the bracket 26, upper and lower steel clevis plates 26c and 26d welded to the front unit framework and pinned to the respective clevis couplings so as to define a vertical boom pivot axis. A pair of turning cylinder mounting steel lugs 28, 30 is welded to each side of the boom mount bracket 26 and connected to the rod end of one of a pair of boom turning cylinders 32, 34. The cylinder ends of cylinders 32, 34 are each connected to a pair of steel mounting lugs 36, 38 welded to the front unit framework. These boom turning cylinders 32, 34 are pivotally mounted to the respective mounting lugs so that they may swing the cutter boom 20 from side to side about its vertical turning axis. The turning cylinders 32, 34 extend through slots 14c, 14d in the steel plate section that covers the front end of the front unit 14. The boom mount bracket 26 is centered on the front end of the front unit 14 and closely spaced thereto. The turning cylinders 32, 34 are mounted to the sides of the front unit framework as shown and, therefore, are angled from their cylinder-end mountings inward and forward to their rod-end mountings. In this configuration, only a small portion of the cylinder rods are ever exposed beyond the covering steel plate 14b and the likelihood of damage is, consequently, greatly minimized. The bottom of the boom mount bracket 26 may carry a steel boom mounting bar 40. Bar 40 may be outwardly-curved steel as shown and serve as a bumber to prevent over-travel of the boom during side-to-side turning. The bar 40 is provided with steel boom mounting tabs 42 that are welded to the front side of bar 40.

The boom mounting bar 40 is welded to the bottom of the boom mount bracket 26 and the cutter boom is pivotally mounted thereto on a horizontal axis for up and down movement. The inner end of the boom is provided with clevis couplings 44 to which the mounting tabs 42 are pinned. The cutter boom 20 comprises a pair of side members 50, 52 which may be each fabricated of steel bars welded to truss framework 54 covered by steel plate 56. The side member trusses are cross-connected by steel stabilizer members welded thereto; 58 the inner end, 60 at mid-span, and 62 at the outer boom end. The inner connector 58 carries the mounting clevis couplings 44. The bottom line of the boom framework is angulated so that, with respect to the boom inner 59 and outer 63 ends, a mid-point apex 64 is provided. The bottom boom lines are angulated upward toward the apex 64 from their respective ends to provide the elevated boom midsection as shown. With this bottom line configuration, the boom may be lowered over a stump or other obstruction for cutting on the far side of the obstruction. The cutter boom 20 is raised and lowered by means of hydraulic cylinder 66 that is pivotally connected to the top of boom mount bracket 26 and the mid-span boom cross brace 60. A pair of cylinder-end steel lugs 68 are welded to the top of the boom mount bracket 26 and a pair rod-end steel lugs 69 are welded to the top of the mid-span boom cross brace 60.

The cutter head assembly comprises a cutter blade 70, mounted to a perpendicular drive shaft 72 that extends through a mounting plate 74 and into a motor housing 76 where it is connected to an appropriate hydraulic drive motor. Motor housing 76 is mounted on the upper surface of the plate 74. The attachment 78 between the outer end of boom member 20 and the cutter head assembly is provided by a pair of mounting lugs 80 that are also mounted to the upper surface of the plate 74. The mounting lugs of the pair 80 are spaced apart sufficient to bracket the outer end of the boom member 20 and are pivotally connected thereto by load-bearing pivot pin 82. A hydraulic cylinder 84 is pivotally mounted to the mid-span cross brace 60 and to the upper end of housing member 76 to effect pivoting of the cutter head assembly relative to its mounting boom. A pair of steel rod-end mounting lugs 75 are welded to the motor housing 76 and a pair of cylinder-end steel mounting lugs 77 are welded to the cross brace 60 for pivotally connecting cylinder 84. Because the underside of the boom, adjacent the cutter head assembly is angled upward toward the apex 64, the leading edge of the cutter blade can be tipped downward to a considerable degree without blade interference contact with the boom. The configuration of the boom is such that the steel cover plate shrouds the cutter motor housing 76, and the leading edge of the cutter blade can be tipped upward to a considerable degree without housing interference contact with the boom.

Hydraulic lines to operate the cutter motor within motor housing and the hydraulic cylinder must extend from the vehicle out along the boom. The hydraulic lines extend between the truss members and are protected. Likewise, the hydraulic cylinder is protected by the truss members. The forward ends of the truss members extend along side of the motor housing to protect it and to guide brush around it. When the cutter head is pivoted, the motor housing will shift upwardly and rearwardly between the truss members, further shielding the motor housing from surrounding brush and the like.

The front and rear undercarriage units 12 and 14 are coupled about a vertical axis for articulated movement by coupling means 90. Upper and lower steel clevis couplings 90a and 90b are welded to the rear unit, and upper and lower steel clevis plates 90c and 90d are welded to the front unit framework and pinned to the respective clevis couplings so as to define a vertical axis about which the two units articulate. A pair of turning cylinder mounting steel lugs 92, 94 is welded to the rear unit on opposite sides of the pivot axis and connected to the rod end of one of a pair of turning cylinders 96, 98. The cylinder ends of cylinders 96, 98 are each connected to a pair of steel mounting lugs 100, 102 welded to the front unit framework. These turning cylinders 96, 98 are pivotally mounted to the respective mounting lugs so that they may swing the rear and front units from side to side about their vertical pivot axis. The points of interconnection between the two units, as above described, are positioned so that the vertical pivot axis and the two rod-end pivot points are coplaner. The turning cylinders 96, 98 extend through slots 14e and 14f in the steel plate section that covers the back end of the front unit 14. The turning cylinders are mounted parallel to the in-line longitudinal axis of the front and rear units so that, in conjunction with the above-mentioned alignment of the pivot points, the maximum travel of the cylinder rods can be obtained for a given degree articulated movement between the front and rear units. The back end of the front unit and/or the front end of the rear unit may be tapered to permit a greater degree of articulated movement between the two units while maintaining a close spacing between the units.

The wheels 120 are individually driven through a Planetary-drive drive train 122, 122 that is jointed for pivotal movement between the two units 12 and 14. The drive train is supported within the two undercarriages and protected therein. The rear unit 12 is provided with a hydraulic tilt engine hood cover 124, and hydraulic fluid and engine fuel tanks 126, 128. The tanks are located in front of the engine cover and accessible without having to raise the cover.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. A vehicle-mounted brush cutting apparatus which comprises:
   an articulated vehicle comprising a rear powered unit and a front steering unit, boom means pivotally mounted to the front of said steering unit for pivotal movement from side to side and up and down, said boom means extending outward from said steering unit for mounting a cutter head assembly on the outer end thereof, steering means connecting said rear powered and said front steering units whereby said units may be turned relative to each other; and boom control means for swinging said boom means from side-to-side;
   a cutter head assembly mounted to the end of said vehicle boom means, the cutter head assembly comprising a generally circular rotary cutter blade, and a blade-rotating motor and drive shaft means; cutter mounting means for connecting said cutter head assembly to said boom means; and power means for operating said motor and drive shaft means to cause said cutter blade to rotate.

2. The apparatus according to claim 1 where said cutter head assembly includes a motor housing containing said motor and drive shaft means, and said boom means includes a truss framework means mounted to at least a portion of said boom means and extending longitudinally of said boom means along each side of said motor housing to encompass and protect said motor housing.

3. The apparatus according to claim 1 wherein said boom means includes a truss framework providing an inverted apex in its lower mid-portion whereby said cutter head may be lowered for cutting on the far side of an obstruction located between said vehicle and said cutter head.

4. The apparatus according to claim 1 including hydraulic cylinders located within said steering unit and connected to said boom means for swinging said boom means from side to side; and including hydraulic cylinders within said steering unit and connected to said powered unit for turning said steering and powered units relative to each other; said steering unit having an undercarriage within which said hydraulic cylinders are so located whereby the hydraulic cylinder rods of said hydraulic cylinders extending respectively to said boom means and said powered unit are minimally exposed during operation of said apparatus.

5. A vehicle-mounted brush cutting apparatus which comprises:

an articulated vehicle comprising a rear powered unit and a front steering unit, and boom means pivotally mounted to the front of said steering unit for pivotal movement from side to side and up and down, said boom means extending outward from said steering unit for mounting a cutter head assembly on the outer end thereof;

a cutter head assembly mounted to the end of said vehicle boom means, the cutter head assembly comprising a generally circular rotary cutter blade, and a blade-rotating motor and drive shaft means; cutter mounting means for connecting said cutter head assembly to said boom means; and power means for operating said motor and drive shaft means to cause said cutter blade to rotate;

said cutter head assembly including a motor housing containing said motor and drive shaft means, and said boom means including a truss framework means mounted to at least a portion of said boom means and extending longitudinally of said boom means along each side of said motor housing to encompass and protect said motor housing;

said boom means including a truss framework providing an inverted apex in its lower mid-portion whereby said cutter head may be lowered for cutting on the far side of an obstruction located between said vehicle and said cutter head; and including hydraulic cylinders located within said steering unit and connected to said boom means for swinging said boom means from side to side; and including hydraulic cylinders within said steering unit and connected to said powered unit for turning said steering and powered units relative to each other; said steering unit having an undercarriage within which said hydraulic cylinders are so located whereby the hydraulic cylinder rods of said hydraulic cylinders extending respectively to said boom means and said powered unit are minimally exposed during operation of said apparatus.

* * * * *